US009571025B2

(12) United States Patent
Müssenberger et al.

(10) Patent No.: US 9,571,025 B2
(45) Date of Patent: Feb. 14, 2017

(54) MOTOR APPARATUS HAVING SEPARATE WINDING SYSTEMS AND MASTER MODULE

(71) Applicant: SIEMENS AKTIENGESELLSCHAFT, München (DE)

(72) Inventors: Christian Müssenberger, Erlangen (DE); Herbert Pommer, München (DE); Georg Schlatterer, Zahling (DE); Carsten Spindler, Remptendorf (DE); Guido Stöppler, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/738,263

(22) Filed: Jun. 12, 2015

(65) Prior Publication Data
US 2015/0365036 A1    Dec. 17, 2015

(30) Foreign Application Priority Data

Jun. 13, 2014  (EP) .................................. 14172270

(51) Int. Cl.
*H02P 1/46* (2006.01)
*H02P 25/22* (2006.01)
*H02P 6/16* (2016.01)

(52) U.S. Cl.
CPC ............. *H02P 25/22* (2013.01); *H02K 11/21* (2016.01); *H02K 2201/15* (2013.01); *H02P 6/16* (2013.01)

(58) Field of Classification Search
CPC .............. B25J 3/04; G08C 19/38; B60T 7/042
See application file for complete search history.

(56) References Cited

U.S. PATENT DOCUMENTS

| 2002/0113511 A1 | 8/2002 | Hashiguchi |
| 2010/0185320 A1 | 7/2010 | Stoeppler |
| 2011/0057591 A1 | 3/2011 | Kazama |
(Continued)

FOREIGN PATENT DOCUMENTS

EP    1063753 A1    12/2000

*Primary Examiner* — Karen Masih
(74) *Attorney, Agent, or Firm* — Henry M. Feierieisen LLC.

(57) ABSTRACT

A motor apparatus includes a motor having a first active part and a second active part, the first active part having a plurality of separately controllable windings, a control unit comprising a processing unit and for each of one or more of the windings a motor module, wherein the motor module has a power converter. The motor apparatus further has and a sensor device constructed to supply a position signal indicative of a position of the first active part relative to the second active part, wherein one of the motor modules is a master module, which receives the position signal directly from the sensor device as the only one of the motor modules, and transmits an item of position information corresponding to the position signal to the processing unit, and wherein another one of the motor modules is a slave module, which receives directly from the processing unit a single item of information regarding the position of the first active part relative to the second active part and controls the one or more windings as a function of the single item of information.

11 Claims, 1 Drawing Sheet

(56) References Cited

U.S. PATENT DOCUMENTS

| | | |
|---|---|---|
| 2011/0221570 A1 | 9/2011 | Finkler |
| 2011/0238249 A1 | 9/2011 | Ananthakrishna |
| 2014/0021279 A1 | 1/2014 | Berchten |
| 2014/0105768 A1* | 4/2014 | Franz .................. F04B 9/02 417/415 |

* cited by examiner

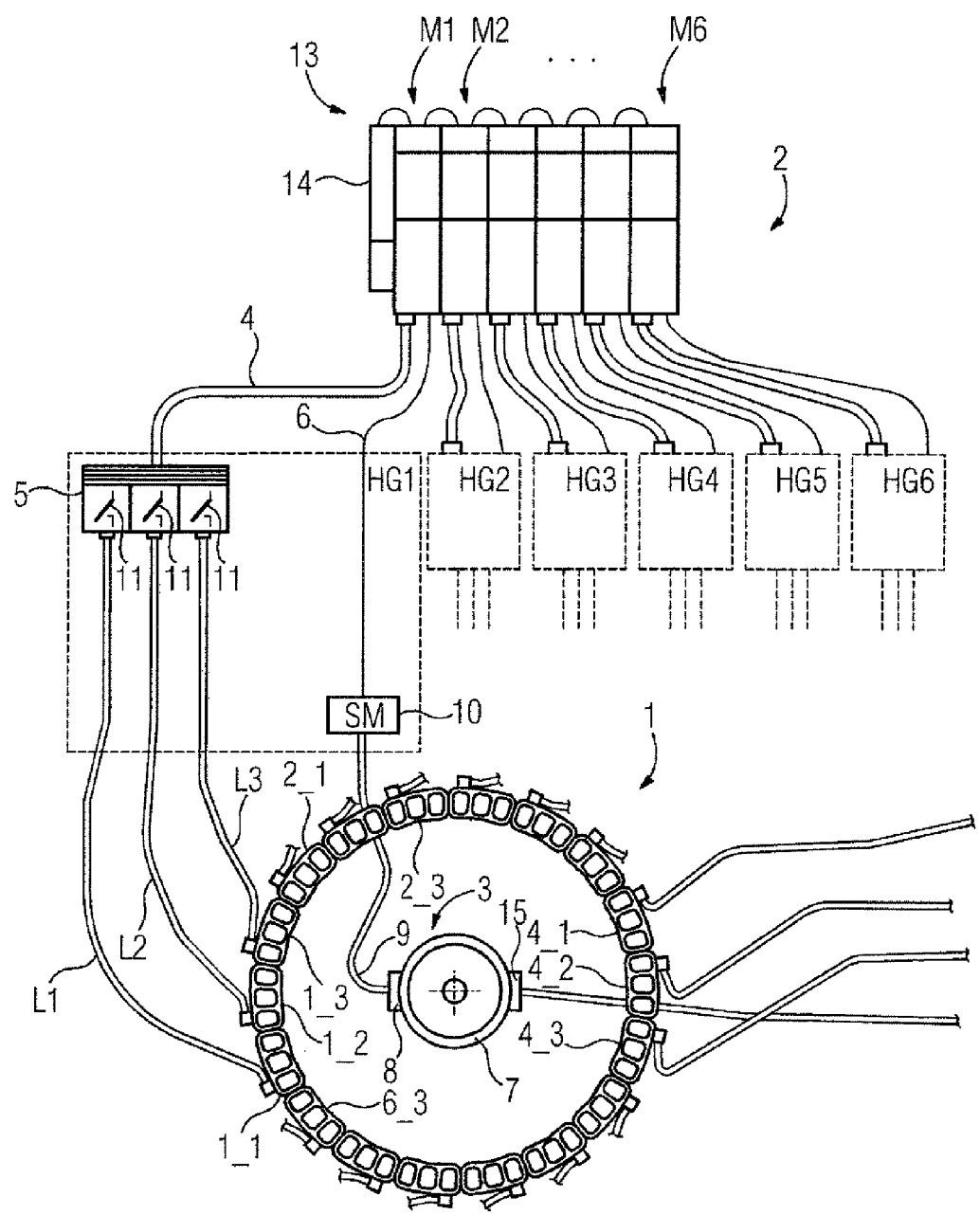

MOTOR APPARATUS HAVING SEPARATE WINDING SYSTEMS AND MASTER MODULE

CROSS-REFERENCES TO RELATED APPLICATIONS

This application claims the priority of European Patent Application, Serial No. EP14172270, filed Jun. 13, 2014, pursuant to 35 U.S.C. 119(a)-(d), the disclosure of which is incorporated herein by reference.

BACKGROUND OF THE INVENTION

The present invention relates to a motor apparatus.

The following discussion of related art is provided to assist the reader in understanding the advantages of the invention, and is not to be construed as an admission that this related art is prior art to this invention.

Applications in which extremely high forces and/or torques are required have to resort to motors that have distributed winding systems. This is the case, for example, in segmented motor applications or when linear and torque motors are connected in parallel, but also, for instance, for spindle motors having two winding systems. These applications use inverters which each work effectively in parallel and which each control one winding system and require a dedicated encoder in order to obtain position information regarding the relative position of its active parts (e.g. stator to rotor).

In previously implemented applications, a segmented motor is operated in a type of master-slave configuration. For this purpose, the first motor module, which contains an inverter or power converter, in particular a frequency converter with intermediate voltage circuit, is the master in controlling the speed, and all the further motor modules, which likewise contain a power converter or inverter, are operated as torque slaves. The same applies to high-power linear motors and torque motors operated by a plurality of motor modules. Examples here may be dual-chamber applications or large, extremely rigid cast-iron pivot axes. It is also possible as an alternative to use a higher level controller for true master-slave operation using a torque-compensation controller.

Until now it was necessary for each motor module to use a dedicated encoder to obtain an individual item of position information for the commutation, with each encoder being connected to the motor module via a corresponding sensor module. For this purpose usually either a plurality of encoder heads (one for each motor module) are mounted on a shared physical measurement reference or only one reading head is used and the encoder signal is duplicated via an encoder splitter. The duplicated encoder signals are then each provided to the relevant inverter via a sensor module.

It would therefore be desirable and advantageous to provide a simpler design of a motor apparatus having a plurality of winding systems and a corresponding method for a simple control of such a motor apparatus.

SUMMARY OF THE INVENTION

According to one aspect of the present invention, a motor apparatus includes a motor having a first active part and a second active part, wherein the first active part has a plurality of separately controllable windings; a control unit including a processing unit and for each of one or more of the windings a motor module, wherein the motor module has a power converter; and a sensor device constructed to supply a position signal indicative of a position of the first active part relative to the second active part, wherein one of the motor modules is a master module, which receives the position signal directly from the sensor device as the only one of the motor modules, and transmits an item of position information corresponding to the position signal to the processing unit, and wherein another one of the motor modules is a slave module, which receives directly from the processing unit a single item of information regarding the position of the first active part relative to the second active part and controls the one or more windings as a function of the single item of information.

According to another aspect of the present invention a method for controlling a motor apparatus, includes: providing as part of the motor apparatus a motor, having a first active part which has a plurality of separately controllable windings, a second active part, and a control unit, which has a processing unit and for each of one or more of the windings has a motor module containing a power converter. the method further includes the steps of sensing with a sensor device a position of the first active part relative to the second active part and generating a position signal indicative of the position of the first active part relative to the second active part, supplying the position signal directly to a single one of the motor modules, wherein the single motor module is a master module, transmitting to the processing unit an item of position information commensurate with the position signal; supplying directly from the processing unit to another one of the motor modules, a single item of position-related information regarding the position of the first active part relative to the second active part as a function of the position information, said other motor module being a slave module, and controlling the one or more windings as a function of the single item of position-related information.

Thus advantageously in a motor apparatus having a plurality of separately controllable windings, which are independent of one another, there is no need for each of these windings to be controlled fully independently of one another. Instead, an item of position information for determining a commutation angle is used not only for a single motor module (power converter) but this item of position information is also used for further motor modules in the motor control unit. Thus a hierarchal system is established in which only one of the motor modules can receive an item of position information via an encoder signal and hence can be used like conventional motor modules. The remaining motor modules (slave modules) receive the position information via a processing unit, which in turn has received this information from the master module. It is thereby possible to dispense with providing a dedicated encoder or sensor for each motor module. In addition, it is not necessary to use a special splitter device to duplicate an encoder signal and to have the individual motor modules receive said signal individually.

The position-related information from the processing unit to a slave module may be, but need not be, identical to the position information from the sensor device to the master module. In fact the information can be processed further and, if applicable, parameterized specifically for the slave module.

In an exemplary embodiment, the motor is a segmented motor, the first active part of which comprises a plurality of segments, with each of the windings being assigned to a single segment of the segments of the segmented motor. Since the position of the individual segments of the segmented motor relative to one another is known, it is sufficient to establish the position of one of the segments relative to the rotor in order also to know or also be able to determine the relative position of the remaining segments to the rotor.

In a further exemplary embodiment, the motor is designed as a linear motor or torque motor in which the winding systems are arranged in parallel with one another. This means that the plurality of winding systems act on an axis (rotational axis or linear axis) in parallel and hence each of the winding systems has the same position, or at least an already known position, in relation to the respective axis. This means that if the position of a first of the winding systems is known, then the position of a second winding system of the winding systems is also known, because the winding systems have a fixed spatial relationship to one another.

In a further exemplary embodiment, the motor is a rotating multi-winding motor in which the plurality of windings (two, three, etc.) or a plurality of winding systems (e.g. U, V and W in each case) are arranged one inside the other and are part of the stator (first active part). The rotor (second active part) is driven by all the windings/winding systems.

The motor may be a segmented motor, the first active part of which includes a plurality of segments, and each of the winding systems is assigned to a single segment or a plurality of the segments of the segmented motor. Segmented motors that deliver a high torque and require a plurality of inverters can thereby be equipped solely with a single position encoder, which reduces the manufacturing and assembly costs.

Alternatively, the motor may be a linear motor or torque motor in which the winding systems are arranged in parallel with one another. Again in this case, the winding systems are in a fixed spatial relationship and act on a common axis of motion in parallel. For the purpose of detecting the position or for controlling the position or speed, it is again sufficient here to use a single position signal for the entire motor.

In one embodiment, each of the motor modules except for the master module is a slave module of the described type, i.e. a motor module which receives directly from the processing unit a single item of position-related information regarding the position of the first active part in relation to the second active part based on the position information. The entire motor apparatus hence has only a single master module and consequently a single sensor device supplying a single position signal. This allows considerable savings in cost and labor for the installation.

According to another advantageous feature of the invention the motor apparatus may have a second sensor device for providing a second position signal indicative of the position of the first active part relative to the second active part, wherein the processing unit generates a mean position signal that from the position signal and the second position signal which is used as the basis for controlling the motor modules. This means that two signals exist that provide information about the relative position between the first active part and second active part. This may be necessary, for example, in large motor apparatuses that have a relatively large eccentricity. This allows even a relatively large motor to be controlled precisely.

Each slave module can be solely under torque control. Thus it is possible to dispense with position and/or speed control, because this form of control can be performed by the master module, to which the slave modules have a fixed spatial relationship.

Each of the motor modules can control a plurality of the segments at a time, which segments are interconnected in parallel. This means that one motor module, i.e. a single converter, can control a plurality of segments. Such a feature again allows a compromise to be found between control-system complexity and operating characteristics of the motor.

In addition, each segment can be controlled via a separate circuit breaker. This can be used to ensure that the conductors and windings of the individual segments are not overloaded.

A data bus is preferably used to connect the motor modules to one another and to the processing unit. Such a data bus allows motor apparatuses to have an individual modular design without having to provide complicated data communication.

The features mentioned above as developments of the invention do not relate solely to the motor apparatus but also develop the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which FIG. 1 shows a schematic diagram of a motor apparatus according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments described in greater detail below constitute preferred embodiments of the present invention. The examples are based on the fundamental idea that in motors having distributed winding systems, in principle only a single encoder signal is needed if the winding systems and their inverters are operated in parallel. This can be implemented by a software application, which makes it possible to dispense with unnecessary hardware components for encoder-signal generation. Furthermore, wiring costs and susceptibility to errors can be reduced.

FIG. 1 shows schematically a segmented motor 1 and a control unit 2, which together with a sensor device 3 on the segmented motor 1 constitute an exemplary motor apparatus.

The segmented motor 1 has a distributed winding system. This means that its stator has a plurality of independent windings distributed around the circumference, each of which windings constitutes here a segment $1\_1$, $1\_2$, $1\_3$, $2\_1$, ... $6\_3$. The segmented motor 1 in this case has eighteen segments evenly distributed around the circumference. The number of segments is not restricted to this number, however, but in principle can be chosen to have any value. Furthermore, it is also not necessary for the segments to be distributed evenly around the circumference. In fact, for example for a servomotor that has to cover a small range of angles, it is sufficient to provide segments solely in a portion of the circle, or to arrange the segments differently for other applications In FIG. 1, three segments at a time are grouped together. Again the number of segments per group can be chosen to have any value. Thus for instance, only one single segment or even two segments, four segments etc. can also be chosen per group.

In the present example in FIG. 1, the segments 1_1, 1_2 and 1_3 arranged one after the other in the circumferential direction form a first group, the segments 2_1 to 2_3 arranged one after the other form a second group etc.

The segments in the first group are controlled in parallel by a motor module M1 of the control unit 2. This means that they are each controlled by the same power signal. For this purpose, a power signal that is output from the motor module M1 in a power line 4 is split into three control signals, i.e. one control signal per segment in the group, in the motor supply lines L1, L2 and L3. Thus if the motor module M1 is supplying 150 A, for example, each winding or each segment in this first group receives 50 A in this case. A splitter 5 is provided for this purpose, which distributes the power signal from the power line 4 equally to the three motor supply lines L1, L2 and L3. The splitter 5 is here also provided with circuit breakers 11 in order to protect the motor supply lines L1, L2 and L3 of the segments 1_1, 1_2 and 1_3 from excessively high currents.

In this example, the motor module M1 comprising an inverter or power converter not only supplies a control signal for the segments 1_1, 1_2 and 1_3 but also receives sensor information via a sensor line 6. Such sensor information is a item of position information generated by the sensor device 3. The sensor device 3 contains in particular an encoder ring 7, which is fixed to a rotor (not shown) of the segmented motor 1. This encoder ring 7 thus rotates with the rotor and is detected by an encoder head 8 of the sensor device 3. A position signal is thereby generated that constitutes a item of position information of the segmented stator (first active part) in relation to the rotor (second active part).

The position signal from the encoder head 8 is conducted via an encoder cable 9 to a sensor module (SM) 10. Alternatively, the position signal can also be fed directly into the motor module M1.

The components constituted by splitter 5 and sensor module 10 are here combined as a hardware group HG1. This hardware group is optional overall and not essential to the invention. In the present example, however, identical hardware groups HG2 to HG6 can be used to control each of the further groups of segments 2_1, 2_2, 2_3, . . . , 6_1, 6_2 and 6_3 from respective motor modules M2 to M6. The hardware groups HG2 to HG6 are identical to HG1 only insofar as that they do not have a sensor module 10 and do not receive a position signal from an encoder.

The motor modules M1 to M6 can also have an identical design. Each of these motor modules has an inverter or power converter, which it uses to control the corresponding group of segments. Thus, for instance, the motor module M2 controls the segments 2_1, 2_2 and 2_3, and the motor module M6 controls the segments 6_1, 6_2 and 6_3.

The motor modules M1 to M6 are interconnected for signal communication with one another via a data bus 13. In addition, a processing unit (CPU) is connected to the motor modules M1 to M6 via the data bus 13.

The motor module M1 is configured here as the master module. In the chosen example, it is the only motor module that receives a item of position information or a position signal from the sensor device 3. It uses this position information itself to calculate therefrom a commutation angle for the segments 1_1, 1_2 and 1_3 of the segmented motor 1 or to have the processing unit 14 calculate same. The processing unit 14 receives from the master module M1 the position information or the commutation angle and uses this to control the inverters of the modules M2 to M6, which constitute slave modules. For this purpose, the processing unit 14 supplies either the position information or directly the corresponding commutation angles to the slave modules M2 to M6.

A segmented motor, in particular if it is relatively large, may have an undesirably high eccentricity error. It can therefore be necessary to obtain an additional item of position information on the rotor and use it to control the segments. Thus the FIGURE symbolically depicts a second encoder head 15, which senses the encoder ring 7 and in this case sits opposite to the first encoder head 8. This second encoder head 15 thus supplies here a second position signal, which can be supplied to the processing unit 14 via the master module. The encoder heads 8 and 15 may be an incremental encoder or absolute encoder.

Alternatively, the two position signals can also be supplied to the processing unit for averaging. In this case, the motor module M1 can remain the only master module for the remaining slave modules M2 to M6.

The further connections for the segments 2_1 to 6_3 are indicated merely schematically in the FIGURE. Only the connections for the segments 4_1, 4_2 and 4_3 are shown slightly longer, although this is not meant to denote a difference. These connections would then be routed, for example, to the hardware group HG4.

In an alternative embodiment, the motor is not a segmented motor but, for example, a linear motor or torque motor having parallel-connected windings. In the case of a linear motor, the active parts are the primary part and secondary part. Both the primary part and the secondary part may comprise parallel windings that are in a fixed spatial relationship to one another. Hence again in this case, one encoder is sufficient for determining the position of the primary part relative to the secondary part.

If the motor is a torque motor having parallel windings, the stator comprises, for example, two annular stators arranged axially one after the other. Since these stators are also in a fixed spatial relationship to one another, a single encoder is sufficient to supply a item of position information regarding the relative position of the rotor to the stators. Each of the plurality of stators is again here controlled, for example, by a separate motor module. That motor module which receives the position information directly from the encoder again acts as the master module, whereas the other motor modules act as slave modules.

The principle according to the invention can also be applied to a multi-winding motor such as a type 1 FW4 motor from the applicant. In this case, the stator is formed by two or more multiphase winding systems (U-V-W in each case), in the simplest case also by just two windings that are arranged one inside the other. Each of the winding systems or each of the windings is supplied here by a dedicated motor module (e.g. a frequency converter with intermediate voltage circuit). One of the motor modules, which forms the master, receives the position signal from a sensor device. The second or further module constitutes a slave, which then controls the associated further winding system according to the single item of position-related information from the master. Such multi-winding motors are preferably housed in a housing, out of which are taken the connections for all the windings (the winding systems) to which the motor modules must be connected. Applications of such multi-winding motors are high-speed spindles and high-torque motors.

The manner of operation of the motor apparatuses according to the invention and the corresponding method are presented in greater detail below. Inside the processing unit 14 of the drive system, the encoder information from the encoder head 8 is known at the master module M1. Since the slave modules M2 to M6 are preferably operated only under torque control, the encoder information is only needed after startup in order to identify the rotor position (commutation). The coupling of all the windings or stator parts via the permanent-magnet rotor, or the common secondary-part track and the installation determined by the structural design, means that the commutation angle is the same for all the stators or stator parts. This condition is always met in segmented motors or in the linear motors and torque motors operated in parallel. A software application is used by the processing unit 14 to transfer the commutation angle from the master M1 to the slaves M2 to M6. Hence encoder hardware for the slaves can be dispensed with entirely.

Thus advantageously the position information that exists for one winding system can also be used for other winding systems. In this case, ingenious internal routing of the encoder information from the master to the slaves avoids the time-consuming identification of the rotor position for each individual slave and reduces considerably the susceptibility of the entire system to errors. As was already mentioned above, there are resultant advantages also for hardware complexity. One sensor module and either one encoder head or the hardware for encoder-signal splitting can be saved for each slave module. Furthermore, the wiring costs and the amount of space required in the control cabinet are reduced. The susceptibility to mistakes in the wiring is also reduced, and encoder-signal errors arising from analog signal processing or delay effects in digital signal processing in the external signal splitters are avoided. A further advantage is that by using a software application, absolute encoders can also be used even when there are no signal splitters available for these encoders.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor apparatus comprising:
   a motor having a first active part and a second active part, said first active part having a plurality of separately controllable windings;
   a control unit comprising a processing unit and for each of one or more of the windings a motor module, said motor module having a power converter; and
   a sensor device constructed to supply a position signal indicative of a position of the first active part relative to the second active part,
   wherein one of the motor modules is a master module, which receives the position signal directly from the sensor device as an only one of the modules, and transmits an item of position information corresponding to the position signal to the processing unit, and
   wherein another one of the motor modules is a slave module, which receives directly from the processing unit a single item of information regarding the position of the first active part relative to the second active part and controls the one or more windings as a function of the single item of information.

2. The motor apparatus of claim 1, wherein the motor is a segmented motor, wherein the first active part comprises a plurality of segments, and wherein each of the windings is assigned to a single one of the segments.

3. The motor apparatus as claimed in claim 1, wherein the motor is a linear motor or torque motor, and wherein the windings are arranged in parallel with one another.

4. The motor apparatus of claim 1, wherein the second active part is a rotor, and wherein the plurality of windings or winding systems are part of a stator of the motor and are arranged in the axial direction of the rotor.

5. The motor apparatus of claim 1, wherein each of the motor modules except the master module is a slave module.

6. The motor apparatus of claim 1, further comprising a second sensor device for providing another position signal indicative of the position of the first active part relative to the second active part, wherein the processing unit calculates a mean position signal from the position signal and the other position signal, wherein the other one of the motor modules controls the one or more windings as a function of the mean position signal.

7. The motor apparatus of claim 1, wherein each slave module is solely under torque control.

8. The motor apparatus of claim 2, wherein each of the motor modules controls a plurality of the segments at a time, said segments being interconnected in parallel.

9. The motor apparatus of claim 8, further comprising circuit breakers, wherein each segment is controlled via a separate one of the circuit breakers.

10. The motor apparatus of claim 1, further comprising a data bus connecting said motor modules to each other and to the processing unit.

11. A method for controlling a motor apparatus, comprising:
    providing as part of the motor apparatus
    a motor, having a first active part which has a plurality of separately controllable windings,
    a second active part, and
    a control unit, which has a processing unit and for each of one or more of the windings has a motor module containing a power converter;
    with a sensor device sensing a position of the first active part relative to the second active part and generating a position signal indicative of the position of the first active part relative to the second active part;
    supplying the position signal directly to a single one of the motor modules, said single motor module being a master module;
    transmitting to the processing unit an item of position information commensurate with the position signal;
    supplying directly from the processing unit to another one of the motor modules, a single item of position-related information regarding the position of the first active part relative to the second active part as a function of the position information, said other motor module being a slave module; and controlling the one or more windings as a function of the single item of position-related information.

\* \* \* \* \*